United States Patent
Kreider

[15] 3,682,951
[45] Aug. 8, 1972

[54] 1-[β-(1-ADAMANTYLOXY)HALOPHENETHYL] IMIDAZOLES AND CONGENERS

[72] Inventor: Eunice M. Kreider, Chicago, Ill. 60680

[73] Assignee: G. D. Searle & Co., Chicago, Ill.

[22] Filed: Nov. 2, 1970

[21] Appl. No.: 86,271

[52] U.S. Cl. ................................260/309, 424/273
[51] Int. Cl. .................................................C07d 49/36
[58] Field of Search.....................................260/309

[56] References Cited

UNITED STATES PATENTS 3,438,992   4/1969   Shen et al. ................260/309
3,531,494   9/1970   Adolphi.....................260/309

OTHER PUBLICATIONS

Cosar et al. Arzneimittel-Forsch. Vol. 16, page 24 relied on (1966). RS1.A8
Dikolenko et al. Chem. Abst. Vol. 72, No. 121067x (1970). QD1.A51
Godefroi et al. J. Med. Chem. Vol. 12, pages 784–791 (1969). RS1.J5

*Primary Examiner*—Natalie Trousoe
*Attorney*—John M. Brown, John J. Kolano, Elliot N. Schubert, Lowell C. Bergstedt, Sybil Meloy, Walter C. Ramm and Helmuth A. Wegner

[57] ABSTRACT

Preparation of 1-[(3-(1-adamantyloxy)phenethyl]imidazoles and congeners— for example, 1-[β-(1-adamantyloxy)-4-chlorophenethyl]imidazole oxalate— and 3-(1-adamantyl)-1-[(β-hydroxyl)halophenethyl] imidazolium bromide by-products, together with biological properties thereof including antibacterial, antiprotozoal, anthelmintic, antifungal, and antialgal activities, are disclosed.

7 Claims, No Drawings

1-[β-(1-ADAMANTYLOXY)HALOPHENETHYL] IMIDAZOLES AND CONGENERS

This invention relates to 1-[β-(1-adamantyloxy)halophenethyl]imidazoles and congeners, by-products thereof, and processes for their preparation. More particularly, this invention provides new, useful, and unobvious chemical compounds of the formula

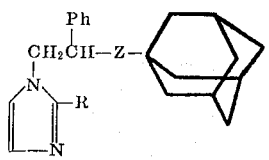

wherein R represents hydrogen or lower alkyl; Z represents oxygen or optionally-oxygenated sulfur of the formula $$-S(O)_x-$$

in which $x$ represents 0 or a positive integer less than 3; and Ph represents phenyl optionally substituted by lower alkyl, halogen, nitro, lower alkoxy, or (lower alkyl)sulfonyl. As many as 5 such substituents, alike or different, can be present, albeit a single halogen substituent is preferred. Positioning of the substituents(s) with respect to the point of attachment of the phenyl moiety to the 2-carbon chain is not critical.

Those skilled in the art will recognize that when $x$ in the foregoing optionally-oxygenated sulfur is 0, the involved radical is thio, whereas when $x$ is 1 or 2 the radical is sulfinyl or sulfonyl, respectively.

The lower alkyls contemplated above include methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of the formula

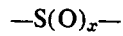

wherein $n$ represents a positive integer less than 8. It follows that the lower alkoxys and (lower alkyl)sulfonyls contemplated above are radicals of the formula

and

respectively, wherein the lower alkyl constituent has the meaning previously assigned.

Equivalent to the foregoing bases for the purposes of this invention are corresponding acid addition salts of the formula

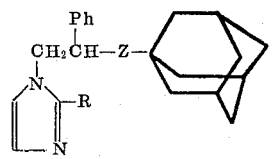

wherein Z, R, and Ph are defined as before; T represents one equivalent of an anion — for example, chloride, bromide iodide, nitrate, phosphate, sulfate, sulfamate, methyl sulfate, ethyl sulfate, benzenesulfonate, toluenesulfonate, acetate, lactate, glycolate, oxalate, succinate, malate, maleate, tartrate, citrate, gluconate, ascorbate, benzoate, cinnamate, or the like — which, in combination with the cationic portion of a salt aforesaid, is neither biologically nor otherwise undesirable; and y represents a positive integer less than 3, its precise value being dependent upon the number of basic nitrogens involved in salt formation.

Equivalent to the foregoing bases and salts for the purposes of this invention are solvates thereof in which biologically insignificant solvent is present.

By-products of the foregoing compounds produced by certain of the processes herein disclosed and likewise new, useful, and unobvious are quaternary salts of the formula

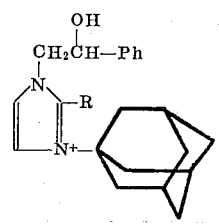

wherein Ph is defined as before and X represents chlorine or bromine.

The compounds herein disclosed are useful by reason of their valuable biological properties. Thus, for example, they inhibit the growth of bacteria such as *Bacillus subtilis* and *Erwinia sp.*; protozoa such as *Trichomonas vaginalis* and *Tetrahymena pyriformis*; helminths such as *Turbatrix aceti*; fungi such as *Trichophyton mentagrophytes*, *Candida albicans*, *Fusarium sp.*, and *Verticillium albo-atrum*; and algae such as *Chlorella vulgaris*.

Those skilled in the art will recognize that observations of activity in standardized tests for particular biological effects are fundamental to the development of valuable new drugs, both veterinary and human. Distinct from such applications, antialgal compounds are adapted to the conditioning of boiler feed water and the like.

The antibacterial utility of the instant compounds is evident from the results of standardized tests whereby nutrient broth (manufactured by Baltimore Biological Laboratories or Difco) is prepared at twice the concentration recommended by the manufacturer, sterilized, and inoculated with 2 percent (by volume) of a culture of *B. subtilis* or *Erwinia sp.* Meanwhile, compound is heated in sterile distilled water at a concentration of 2000 γ per ml. and a temperature of 80° C. for 20 min. An equivolume mixture of this compound preparation and the inoculated broth is incubated aerobically at 37° C. and then grossly for the growth of the test organism. The incubation period is 20–24 hr. for *B. subtilis* and 24–48 hr. for *Erwinia sp.* If growth of the test organism is observed, the compound is considered inactive. If no such growth is observed, the incubated mixture is serially diluted and mixed with an inoculated broth of the same composition as before excepting that the concentration is halved and 1 percent (by volume) of the culture instead of 2 percent is incorporated. Amounts of the latter broth are added such that concentrations of 100, 10, and 1 γ of compound per ml. result. The mixtures thus obtained are incubated as before and then examined grossly for growth of the test organism.

Potency is expressed as the minimum concentration at which no growth of test organism is discernible. Controls are provided by concurrent incubations identical with the foregoing except for the absence of compound.

The antiprotozoal utility of the instant compounds is evident from the results of a standardized test therefor carried out as described in column 3, line 46, through column 4, line 2, of U.S. Pat. No. 3,483,112, using *T. vaginalis* as the test organism. Further evidence of the antiprotozoal utility of the instant compounds is provided by a standardized test whereby a nutrient broth consisting of 12 gm. of proteose peptone, 8 gm. of sucrose, and 500 ml. of water is sterilized and inoculated with 10 percent (by volume) of an axenic culture of *T. pyriformis*. Meanwhile, compound is heated in sterile distilled water at a concentration of 2,000 γ per ml. and a temperature of 80° C. for 20 min. An equivolume mixture of this compound preparation and the inoculated medium is incubated aerobically at 32° C. for 48 hr. and then examined microscopically for the presence of motile tetrahymena. If any are observed, the compound is considered inactive. If no motile tetrahymena are observed, the incubated mixture is serially diluted and mixed with an inoculated medium of the same composition as that described above excepting that 1,000 parts of distilled water instead of 500 parts and 5 percent (by volume) of the culture instead of 10 percent are incorporated. Amounts of the latter medium added are such that concentrations of 100, 10, and 1 γ of compound per ml. result. The mixtures thus obtained are incubated as before and then examined microscopically for motile tetrahymena. Potency is expressed as the minimum concentration at which no motile tetrahymena are discernible. Controls are provided by concurrent incubations identical to the foregoing except for the absence of compound.

The anthelmintic utility of the instant compounds is evident from the results of a standardized test for their capacity to immobilize *Turbatrix aceti*, a representative nematode. In this test, a washed suspension of *T. aceti* containing approximately 2,000 nematodes per ml. is prepared in distilled water, whereupon 1 ml. of the suspension is mixed with 10 mg. of test compound. The mixture is incubated at room temperatures for 48 hr. and then examined grossly for the presence of motile worms. If any are observed, the compound is considered inactive. If no motile worms are observed, 0.1 ml. of the incubated mixture is serially diluted and mixed with a freshly-prepared suspension of the nematodes to produce concentrations of 1,000, 100, 10, and 1 mcgm. of test compound per ml.; and the resultant mixtures are incubated as before at room temperatures for 48 hr. and then examined grossly for the presence of motile worms. Controls are provided by concurrent incubations identical with the foregoing except for the absence of test compound.

The antifungal utility of the instant compounds is evident from the results of standardized tests whereby two concentrations of Sabouraud dextrose agar (manufactured by Baltimore Biological Laboratories or Difco) are prepared, one as recommended by the manufacturer and the other at twice this concentration. These preparations are sterilized and then maintained in a fluid state at 80° C. Meanwhile, compound is heated in sterile distilled water at a concentration of 2,000 γ per ml. and a temperature of 80° C. for 20 min. An equivolume mixture of this compound preparation and the double-strength agar is serially diluted and mixed with the single-strength agar in amounts such that concentrations of 1,000, 100, 10, and 1 γ of test compound per ml. result. The mixtures thus obtained are allowed to cool and solidfy, whereupon they are surface-inoculated with a suspension of *T. mentagrophytes, C. albicans, Fusarium sp.*, or *V. albo-atrum* and then incubated aerobically at room temperatures. The incubation period is 6–7 days for *T. mentagrophytes*, 48 hr. for *C. albicans*, and 5–7 days for *Fusarium sp.* and *V. albo-atrum*. Activity is determined by gross examination, and the potency is expressed as the minimum concentration at which no growth of the test organism is discernible. Controls are provided by concurrent incubations identical with the foregoing except for the absence of compound. When tested versus *C. albicans* by the foregoing procedure, 1-[β-(1-adamantyloxy)-4-chlorophenethyl]imidazole oxalate, a representative embodiment of this invention, is remarkably and typically effective.

The antialgal utility of the instant compounds is evident from the results of a standardized test for their capacity to prevent the growth of Chlorella vulgaris. In this test, a nutrient medium consisting of 0.25 gm. of sodium nitrate, 0.025 gm. of calcium chloride, 0.175 gm. of monobasic potassium phosphate, 0.075 gm. of dibasic potassium phosphate, 0.075 gm. of magnesium sulfate, 0.025 gm. of sodium chloride, 0.005 gm. of ferric chloride, 3.0 gm. of yeast extract (Difco), and 10.0 ml. of a soil extract prepared by sterilizing a mixture of soil and distilled water and removing insoluble solids therefrom, plus sufficient additional distilled water to bring the final volume to 500 ml., is sterilized and then inoculated with 2 percent (by volume) of an axenic culture of *C. vulgaris*. Meanwhile, compound is heated in sterile distilled water at a concentration of 2,000 γ per ml. and a temperature of 80° C. for 20 min. An equivolume mixture of the inoculated medium and the compound preparation is incubated aerobically at room temperatures under constant illumination for 4–7 days and then examined grossly for growth of the test organism. If such growth is observed, the compound is considered inactive. If no growth is observed, the incubated mixture is serially diluted and mixed with an inoculated medium of the same composition as that described above excepting that it is made up to a volume of 1,000 ml. instead of 500, and 1 percent (by volume) of the culture instead of 2 percent is incorporated. Amounts of the latter medium added are such that concentrations of 100, 10, and 1 γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound.

Preparation of the adamantyloxy compounds of this invention proceeds by heating a 1-imidazoleethanol of the formula

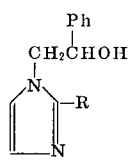

(wherein R and Ph are defined as before) with 1-(chloro/bromo)adamantane in N,N-dimethylformamide, using pyridine as an acid acceptor. The resultant adamantyloxy base is separated from the quaternary salt of the imidazoleethanol starting material obtained as by-product by extraction with benzene.

Preparation of the adamantylthio compounds of the invention proceeds by heating 1-adamantanethiol with sodium amide in N,N-dimethylformamide to form the sodium salt, which is heated in N,N-dimethylformamide with a 1-(β-halophenethyl)imidazole of the formula

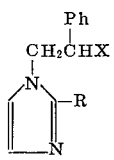

(wherein R, Ph, and X are defined as before). From the resultant adamantylthio base, on contacting with one equivalent of cold m-chloroperbenzoic acid in chloroform solution, the corresponding adamantylsulfinyl compound of the invention eventuates. Alternatively, two equivalents of m-chloroperbenzoic acid affords, if the temperature be elevated and/or the reaction time sufficiently prolonged, the apposite adamantylsulfonyl compound.

Conversion of the bases of this invention to equivalent acid addition salts is accomplished by dissolution in alcohol or other inert solvent, acidification with any of various inorganic and strong organic acids wherein the anion can be represented by T as hereinbefore defined, and adding excess ether or the like if required to effect precipitation. The salts can be converted to bases by dissolving in N,N-dimethylformamide and neutralizing with sodium carbonate.

The 1-imidazoleethanol starting materials can be prepared by contacting in a solvent such as dioxane, ether, or a mixture thereof an appropriate acetophenone of the formula PhCOCH₃

(wherein Ph is defined as before) with bromine, using aluminum chloride as a catalyst if desired, adding the resultant 2-bromoacetophenone to a methanol solution of an appropriate imidazole

(wherein R is defined as before), and reducing the 2-(1-imidazolyl)acetophenone thus obtained with sodium tetrahydroborate in methanol.

The 1(β-halophenethyl)imidazole starting materials can be prepared by heating a 1-imidazoleethanol of the formula

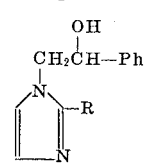

(wherein R and Ph are defined as before) with a thionyl halide of the formula

SOX₂

(wherein X is defined as before). A solvent such as chloroform can be added if desired to promote contact between the reagents. The produced can be isolated as the free base by evaporation of excess thionyl halide, addition of excess aqueous sodium bicarbonate, extraction with chloroform, and removal of solvent via vacuum distillation. Alternatively, the product can be isolated as the corresponding hydrohalide salt by adding an alcohol — or other inert liquid in which the salt is relatively insoluble — q.s. precipitation.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. 2'-Fluoro-2-(1-imidazolyl)acetophenone. To a mixture of 48 parts of 2'-fluoroacetophenone, 65 parts of dioxane, and approximately 95 parts of ether at 10°–20 is slowly added, with stirring, 56 parts of bromine, whereupon stirring is continued at room temperatures for one-half hour while hydrogen bromide is evolved. At this point, a solution of 118 parts of imidazole in 140 parts of methanol is added with vigorous stirring, temperatures again being maintained in the 10°–20° range. When the second addition is complete, stirring is continued at room temperatures for 18 hours. The resultant mixture is partitioned between water and chloroform. The chloroform phase is separated, washed well with hot water, dried over sodium sulfate, and stripped of solvent by vacuum distillation. The brown residue is 2'-fluoro-2-(1-imidazolyl)acetophenone.

B. β-(2-Fluorophenyl)-1-imidazoleethanol. To a solution of 680 parts of 2'-fluoro-2-(1-imidazolyl)acetophenone in 2,400 parts of methanol at 10°–20 is added, portion-wise with stirring, 84 parts of sodium tetrahydroborate. Stirring is continued for 1 ½ hours at room temperatures after the addition is complete, whereupon the reaction mixture is heated at the boiling point under reflux for 2 hours and then stripped of solvent by vacuum distillation. The residue is dissolved in 2,000 parts of water. The aqueous solution is acidified with concentrated hydrochloric acid, then heated ½ hour at 90°–95°, and finally made alkaline with concentrated ammonium hydroxide. On chilling, α-(2-fluorophenyl)-1-imidazoleethanol precipitates which, filtered off and recrystallized from a mixture of methanol and ether using decolorizing charcoal in process, melts at approximately 137°–138°.

C. 1-[β-(1-Adamantyloxy)-2-fluorophenethyl]imidazole and 3-(1-adamantyl)-1-(β-hydroxy-2-fluorophenethyl)imidazolium bromide. A solution of 412 parts of α-(2-fluorophenyl)-1-imidazoleethanol and 440 parts of 1-bromoadamantane in a mixture of 2,375 parts of N,N-dimethylformamide and 490 parts of pyridine, protected from moisture, is heated at the boiling point under reflux for 75 hours, then cooled and partitioned between chloroform and water. The chloroform phase is dried over sodium sulfate and stripped of solvent by vacuum distillation. The residue is extracted with benzene, leaving an insoluble fraction which is worked up as described in the next paragraph; and the benzene extract is chromatographed on silica gel, using benzene and mixtures thereof with increasing amounts of ethyl acetate as developing solvents. From an eluate comprising 10 percent ethyl acetate in benzene, on evaporation of solvent, 1-[β-(1-adamantyloxy)-2-fluorophenethyl]imidazole is obtained as the residue.

The benzene-insoluble fraction is consecutively triturated with hot ethyl acetate and hot chloroform, then recrystallized from a mixture of methanol and ether using decolorizing charcoal in process, to give 3-(1-adamantyl)-1-(β-hydroxy-2-fluorophenethyl)imidazolium bromide melting at 216°–218°. This by-product has the formula

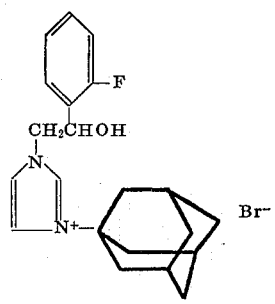

D. 1-[β-(1-Adamantyloxy)-2-fluorophenethyl]imidazole oxalate. A solution of 1 part of 1-[β-(1-adamantyloxy)-2-fluorophenethyl]imidazole in 10 volumes of methanol is acidified with oxalic acid, causing precipitation of 1-[β-(1-adamantyloxy)-2-fluorophenethyl]imidazole oxalate which, isolated by filtration and recrystallized from a mixture of methanol and tetrahydrofuran, melts at approximetely 157°–158°. The product has the formula

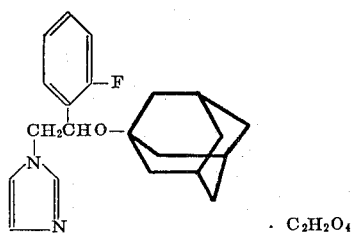

EXAMPLE 2

A. 1-[β-(1-Adamantyloxy)-4-chlorophenethyl]imidazole and 3-(1-adamantyl)-1-(β-hydroxy-4-chlorophenethyl)imidazolium bromide. A solution of 460 parts of α-(4-chlorophenyl)-1-imidazoleethanol [J. Med. Chem., 12, 784 (1969)] and 430 parts of 1-bromoadamantane in a mixture of 2,375 of N,N-dimethylformamide and 490 parts of pyridine, protected from moisture, is heated at the boiling point under reflux for 24 ½ hours, then cooled and partitioned between chloroform and water. The chloroform phase is dried over sodium sulfate and stripped of solvent by vacuum distillation. The residue is extracted with benzene, leaving an insoluble fraction which is worked up as described in the next paragraph; and the benzene extract is chromatographed on silica gel, using benzene and mixtures thereof with increasing amounts of ethyl acetate as developing solvents. From an eluate comprising 30 percent ethyl acetate in benzene, on evaporation of solvent, 1-[β-(1-adamantyloxy)-4-chlorophenethyl]imidazole is obtained as the residue.

The benzene-insoluble fraction is consecutively triturated with hot ethyl acetate and hot chloroform, then recrystallized from a mixture of methanol and ether to give 3-(1-adamantyl)-1-(β-hydroxy-4-chlorophenethyl)imidazolium bromide melting at approximately 261.5°–262°. This by-product has the formula

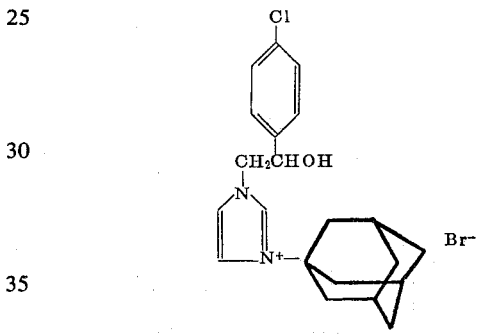

B. 1-[β-(1-Adamantyloxy)-4-chlorophenethyl]imidazole oxalate. A solution of 1 part of 1-[β-(1-adamantyloxy)-4-chlorophenethyl]imidazole in 10 volumes of methanol is acidified with oxalic acid, causing precipitation of 1-[β-(1-adamantyloxy)-4-chlorophenethyl]imidazole oxalate which, isolated by filtration and recrystallized from a mixture of methanol and ether, melts at approximately 198.5°–199.5°. The product has the formula

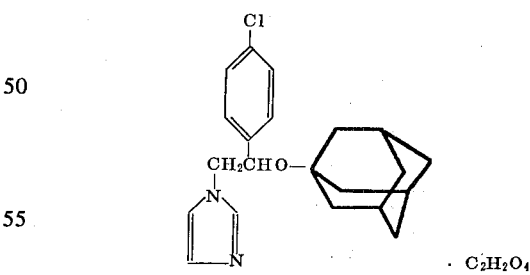

EXAMPLE 3

A. 1-[β-(1-Adamantyloxy)-4-bromophenethyl]imidazole. A solution of 534 parts of α(4-bromophenyl)-1-imidazoleethanol (J. Med. Chem., loc. cit.) and 430 parts of 1-bromoadamantane in a mixture of 2,375 parts of N,N-dimethylformamide and 490 parts of pyridine, protected from moisture, is heated at the boiling point under reflux for 50 hours, then cooled and partitioned between chloroform and water. The chloroform phase is dried over sodium sulfate and stripped of solvent by vacuum distillation. The residue is extracted with benzene; and the benzene extract is chromatographed on silica gel, using benzene and mixtures thereof with increasing amounts of ethyl acetate as developing solvent. From eluates comprising 20 percent, 30 percent, and 50 percent ethyl acetate in benzene, combined and stripped of solvent by vacuum distillation, 1-[β-(1-adamantyloxy)-4-bromophenyl] imidazole is obtained as the residue.

B. 1-[β-(1-Adamantyloxy)-4-bromophenethyl] imidazole oxalate. Substitution of 1 part of 1-[β-(1-adamantyloxy)-4-bromophenethyl]imidazole for the 1-[β-(1-adamantyloxy)-4-chlorophenethyl]imidazole called for in Example 2B affords, by the procedure there detailed, 1-[β-(1-adamantyloxy)-4-bromophenethyl]imidazole oxalate melting at approximately 206°–207°. The product has the formula

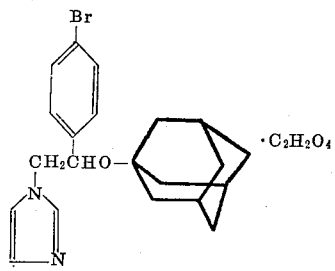

EXAMPLE 4

A. 4'-Iodo-2-(1-imidazolyl)acetophenone. Substitution of 74 parts of 4'-iodoacetophenone for the 2'-fluoroacetophenone called for in Example 1A affords, by the procedure there detailed, 4'-iodo-2-(1-imidazolyl)acetophenone.

B. α-(4-Iodophenyl)-1-imidazoleethanol. Substitution of 1,040 parts of 4'-iodo-2-(1-imidazolyl)acetophenone for the 2'-fluoro-2-(1-imidazolyl)acetophenone called for in Example 1B affords, by the procedure there detailed, α-(4-iodophenyl)-1-imidazoleethanol.

C. 1-[β-(1-Adamantyloxy)-4-iodophenethyl] imidazole. Substitution of 628 parts of α-(4-iodophenyl)-1-imidazoleethanol for the α-(4-bromophenyl)-1-imidazoleethanol called for in Example 3A affords, by the procedure there detailed, 1-[β-(1-adamantyloxy)-4-iodophenethyl]imidazole, having the formula

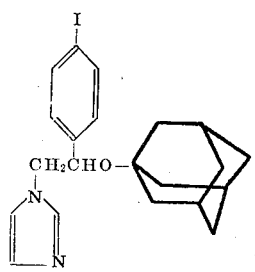

EXAMPLE 5

A. 1-(β-chloro-2-fluorophenethyl)imidazole. A mixture of 26 parts of α-(2-fluorophenyl)-1-imidazoleethanol and 82 parts of thionyl chloride is heated 3 hours at the boiling point under reflux, whereupon excess thionyl chloride is distilled off, and the residue is dissolved in excess aqueous sodium bicarbonate. The resultant mixture is extracted with chloroform. The chloroform solution is washed well with water, dried over sodium sulfate, and stripped of solvent by vacuum distillation. The residue is 1-(β-chloro-2-fluorophenethyl)imidazole.

B. 1-[β-(1-Adamantylthio)-2-fluorophenethyl] imidazole. To a suspension of 120 parts of sodium amide in 1,900 parts of N,N-dimethylformamide is added 336 parts of 1-adamantanethiol. The resultant mixture is heated at 100° for 45 minutes, whereupon a solution of 448 parts of 1-(β-chloro-2-fluorophenethyl)imidazole in 3,325 parts of N,N-dimethylformamide is introduced. The mixture thus obtained is heated at the boiling point under reflux for 3 ½ hours, then partitioned between water and chloroform. The chloroform phase is dried over anhydrous sodium sulfate and stripped of solvent by vacuum distillation. The residue is 1-[β-(1-adamantylthio)-2-fluorophenethyl]imidazole.

C. 1-[β-(1-Adamantylthio)-2-fluorophenethyl] imidazole oxalate. A solution of 1 of 1-[β-(1-adamantylthio)-2-fluorophenethyl]imidazole in 10 volumes of methanol is acidified with oxalic acid and then diluted with ether q.s. incipient precipitation. On cooling, 1-[β-(1-adamantylthio)-2-fluorophenethyl]imidazole oxalate is thrown down which, filtered off and recrystallized from a mixture of N,N-dimethylformamide and ether using decolorizing charcoal in process, melts at 178°–180°. The product has the formula

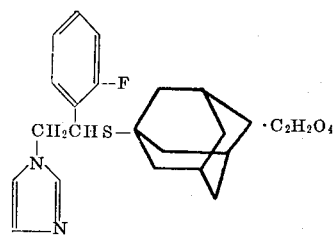

A. 1-(4,β-Dichlorophenethyl)imidazole. Substitution of approximately 48 parts of α-(4-chlorophenyl)-1-imidazoleethanol (J. Med. Chem., loc. cit.) for the α-(2-fluorophenyl)-1-imidazoleethanol called for in Example 5A affords, by the procedure there detailed, 1-(4,β-dichlorophenethyl)imidazole.

B. 1-[β-(1-Adamantylthio)-4-chlorophenethyl] imidazole. Substitution of 482 parts of 1-(4,β-dichlorophenethyl)imidazole for the 1-(β-chloro-2-fluorophenethyl)imidazole called for in Example 5B affords, by the procedure there detailed, 1-[β-(1-adamantylthio)-4-chlorophenethyl]imiddazole.

C. 1-[β-(1-Adamantylthio)-4-chlorophenethyl] imidazole oxalate. Substitution of 1 part of 1-[β-(1-adamantylthio)-4-chlorophenethyl]imidazole for the 1-[β-(1-adamantylthio)-2-fluorophenethyl]imidazole called for in Example 5C affords, by the procedure there detailed, 1-[β-(1-adamantylthio)-4-chlorophenethyl]imidazole oxalate, melting at approximately 189.5°–190°. The product has the formula

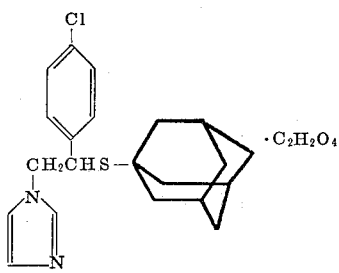

EXAMPLE 7

A. 1-[β-(1-Adamantylsulfinyl)-4-chlorophenethyl]imidazole. To a solution of approximately 300 parts of 1-[β-(1-adamantylthio)-4-chlorophenethyl]imidazole in 7,450 parts of chloroform at 5°–10° is slowly added, with stirring, a solution of 132 parts of 85 percent m-chloroperbenzoic acid in 2,980 parts chloroform. When the addition is complete, stirring at 5°–10° is continued for 2 ½ hours, whereupon the reaction mixture is washed well with aqueous 5 percent sodium bicarbonate, dried over sodium sulfate, and stripped of solvent by vacuum distillation. The residue is slurried with 100 volumes of a 1:1 (by volume) mixture of chloroform and methanol. The slurry is filtered through alumina, and the filtrate is mixed with decolorizing charcoal. The mixture is filtered, and the filtrate is stripped of solvent by vacuum distillation. The residue is 1-[β-(1-adamantylsulfinyl)-4-chlorophenethyl]imidazole.

B. 1-[β-(1-Adamantylsulfinyl)-4-chlorophenethyl]imidazole oxalate. A solution of 1 part of 1-[β-(1-adamantylsulfinyl)-4-chlorophenethyl]imidazole in 10 volumes of methanol is acidified with oxalic acid and then diluted with ether q.s., incipient precipitation. On cooling, 1-[β-(1-adamantylsulfinyl)-4-chlorophenethyl]imidazole oxalate precipitates, which, filtered off and the recrystallized from a mixture of methanol and ether, melts at approximately 152°. The product has the formula

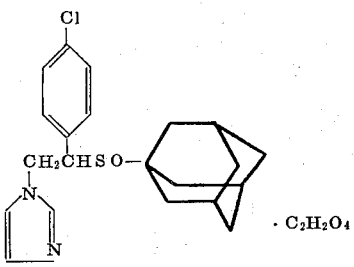

EXAMPLE 8

A. 1-[β-(1-Adamantylsulfonyl)-4-chlorophenethyl]imidazole. To a solution of approximately 300 parts of 1-[β-(1-adamantylthio)-4-chlorophenethyl]imidazole in 7,450 parts of chloroform at 5°–10° is slowly added, with stirring, a solution of 270 parts of 85 percent m-chloroperbenzoic acid in 2,980 parts of chloroform. When the addition is complete, the reaction mixture is heated to the boiling point with stirring and maintained thereat for 3 hours, then washed with aqueous 5 percent sodium bicarbonate, dried over sodium sulfate, and stripped of solvent by vacuum distillation. The residue is 1-[β-(1-adamantylsulfonyl)-4-chlorophenethyl]imidazole.

B. 1-[β-(1-Adamantylsulfonyl)-4-chlorophenethyl]imidazole oxalate. A solution of 1 part of 1-[β-(1-adamantylsulfonyl)-4-chlorophenethyl]imidazole in 10 volumes of methanol is acidified with oxalic acid and then diluted with ether q.s. incipient precipitation. On cooling, 1-[β-(1-adamantylsulfonyl)-4-chlorophenethyl]imidazole oxalate is thrown down which, filtered off and recrystallized from a mixture of ethanol and tetrahydrofuran, is monosolvated with the latter solvent and melts at 137°–138.5°. The non-solvated product has the formula

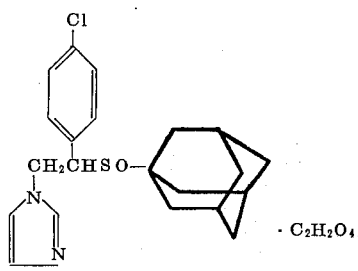

What is claimed is:
1. A compound of the formula

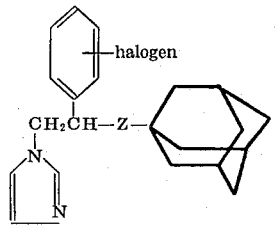

wherein Z represents oxygen or optionally-oxygenated sulfur of the formula $$-S(O)_x-$$

in which x represents 0 or a positive integer less than 3.

2. A compound according to claim 1 having the formula

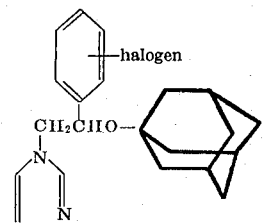

3. A compound according to claim 1 which is 1-[β-(1-adamantyloxy)-4-chlorophenethyl]imidazole.

4. A compound according to claim 1 having the formula

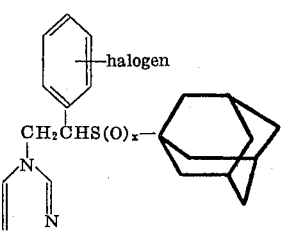

wherein the halogen has an atomic number less than 35 and x represents 0 or a positive integer less than 3.

5. A compound according to claim 1 which is 1-[β-(1-adamantylthio)-2-fluorophenethyl]imidazole.

6. A compound according to claim 1 which is 1-[β-(1-adamantylsulfinyl)4-chlorophenethyl]imidazole.

7. A compound according to claim 1 which is 1-[β-(1-adamantylsulfonyl)-4-chlorophenethyl]-imidazole.

* * * * *